United States Patent [19]

Berta

[11] Patent Number: 4,616,687

[45] Date of Patent: Oct. 14, 1986

[54] TIRE CONTAINING IMPROVED LINER

[75] Inventor: Dominic A. Berta, New Castle County, Del.

[73] Assignee: Hercules Incorporated, Wilmington, Del.

[21] Appl. No.: 818,424

[22] Filed: Jan. 13, 1986

Related U.S. Application Data

[62] Division of Ser. No. 715,326, Mar. 25, 1985.

[51] Int. Cl.$^4$ .......................... B60C 5/02; B60C 5/12; B60C 5/14
[52] U.S. Cl. .................................. 152/510; 152/511; 156/333; 156/334
[58] Field of Search ................ 152/510, 511; 136/333, 136/334

[56] References Cited

U.S. PATENT DOCUMENTS

| | | | |
|---|---|---|---|
| 2,631,984 | 3/1953 | Crawford et al. | 525/215 |
| 2,955,102 | 10/1960 | Clayton et al. | 152/510 |
| 3,586,087 | 11/1968 | Messerly | 152/330 |
| 3,630,974 | 12/1971 | Ladocsi et al. | 525/210 |

Primary Examiner—Jacob Ziegler
Attorney, Agent, or Firm—William E. Player

[57] ABSTRACT

Disclosed are vulcanized compositions of (1) from about 80% to about 99% of a rubber material selected from the group consisting of butyl rubber, halogenated butyl rubber having from about 1% to about 3% by weight of halogen and mixtures thereof, and (2) from about 1% to about 20% of a chlorinated hydrocarbon polymer having a chlorine content of from about 30% to about 70% by weight of chlorine, said composition having good impermeability to gases and tear resistance and being useful in tire inner tubes and inner liners.

6 Claims, No Drawings

TIRE CONTAINING IMPROVED LINER

This application is a division of application Ser. No. 715,326, filed Mar. 25, 1985.

This invention relates to a composition of (1) a rubber material selected from the group consisting of butyl rubber, halogenated butyl rubber and mixtures thereof, and (2) chlorinated hydrocarbon polymer cured with typical cross-linking agents having good impermeability to gases, especially air, which is useful in tire inner tubes and inner liners, particularly in pneumatic tires having a vulcanized rubber liner ply overlying all internal tire surfaces exposed in service to pressurized gas.

Tire liners, based on blends of chlorobutyl rubber with a natural rubber or reclaimed butyl rubber or both, experience difficulty due to diffusion of gases, particularly air through the liner. In the past, epichlorohydrin rubber has been added to the aforementioned blends to improve impermeability (U.S. Pat. No. 3,586,087). However, while these tire liner compositions have good air impermeability, they do not have a good balance of scorch and physical properties.

This invention provides a vulcanized composition having good impermeability, i.e., resistance to gas or air diffusion and tear resistance, comprising, by weight of the composition, (1) from about 80% to about 99% of a rubber material selected from the group consisting of butyl rubber, halogenated butyl rubber having from about 1% to about 3% by weight of halogen, and mixtures thereof, and (2) from about 1% to about 20% of a chlorinated hydrocarbon polymer having a chlorine content of from about 30% to about 70% by weight of chlorine. The physical properties of the cured composition, such as adhesion to the tire carcass, are not adversely affected by the addition of the chlorinated rubber, yet the air impermeability and tear resistance are improved.

As is well known in the art, butyl rubber is a copolymer of from about 95.5% to about 98.5% isobutylene and from about 1.5% to about 4.5% isoprene. Isoprene provides an unsaturated cure site for vulcanizing agents, such as the sulfur and zinc oxide system.

Halogenated butyl rubbers, useful in the practice of this invention, includes chlorobutyl, bromobutyl or blends of chlorobutyl and bromobutyl rubbers, wherein the original unsaturation (usually from about 0.5 to 3.0 mol. % isoprene residues) is largely maintained. A suitably commercially available chlorobutyl rubber contains from about 1.1% to about 1.35% by weight of chlorine and has a Mooney viscosity after 8 minutes at 212° F. using the large (4-inch) rotor of 40 to 89 ML. A satisfactory bromobutyl rubber prepared from a highly unsaturated butyl rubber contains from 2.1 to 3.0% by weight of bromine, a density at 25° C. of about 0.96 g/cc, and evidences a Mooney viscosity at 212° F. of 40 to 70 ML. The halogen in halogenated butyl rubber is present as a result of post-treatment of the butyl rubber by reacting chlorine or bromine with the butyl rubber by methods known in the art.

The preferred rubber material for use in this invention is chlorinated butyl rubber.

The chlorinated hydrocarbon polymers useful in the practice of this invention include chlorinated polyisoprene rubber and chlorinated polyolefins.

Preferably, the chlorinated hydrocarbon polymers have a chlorine content of from about 40% to about 66%, and most preferably from about 63% to about 66%. Typically, the chlorinated hydrocarbon polymers have a molecular weight of about 50,000 to about 1,000,000 as determined by size exclusion chromatography. Chlorinated polyisoprene having from about 63% to about 66% by weight chlorine is the preferred chlorinated hydrocarbon polymer. Generally, the chlorinated hydrocarbon polymer is present in an amount, by weight of the composition, from about 1% to about 20%, preferably from about 2% to about 10%.

Chlorinated polyisoprene and chlorinated polyolefins suitable for use in the practice of this invention are commercially available.

The compatibility of the rubber material and chlorinated hydrocarbon polymer is unexpected in view of the high amount of chlorine in and the polarity of the chlorinated hydrocarbon polymer as compared to the lack of or extremely low amount of halogen and the nonpolarity or relatively slight polarity of the rubber material.

Various amounts of crosslinking agents, accelerators or retarders, which are the typical crosslinking systems used to vulcanize butyl rubber and halobutyl rubber, can be added to the composition of this invention. The optimum amounts will depend upon the degree of crosslinking desired, the degree of scorch safety desired, and the rate of cure desired. The determination of the amounts to be used is well within the knowledge of those skilled in the art.

The crosslinker system can be formulated to cure through the unsaturation with typical sulfur cure systems with appropriate accelerators, or nonsulfur crosslinking systems can be formulated to cure through the chlorine functionally with ethylene thiourea or dimercapto compounds, such as 2,5-dimercapto-1,3,4-thiadiazole, trithiocyanuric acid, dimercaptohydantoins or dimercaptotriazole with an appropriate base activator as set forth in U.S. Pat. No. 4,128,510 or U.S. Pat. No. 4,288,576, the disclosures of which are incorporated herein by reference. Combinations of crosslinking systems can also be used such as, for example, mixtures of up to about 20 parts of a sulfur/accelerator/ZnO sulfur cure package with up to about 10 parts of a di- or tri-functional mercapto compound/Group Ia or IIa metal oxide, hydroxide or carbonate nonsulfur cure system.

In addition to the crosslinking agents, other ingredients commonly used in rubber vulcanization can be used here also. For example, extenders, fillers, pigments, antioxidants, plasticizers, and softeners may be added. The presence of a filler, particularly carbon black, while not necessary, is beneficial.

The composition of this invention can be prepared by blending all desired ingredients, except the crosslinking system, in any desired fashion that allows intimate mixing, for example, in a Banbury mixer or two roll differential speed mill.

The crosslinking system comprising the crosslinking agent, oxides and accelerators can then be incorporated or mixed with the blended ingredients in any desired fashion, such as by simply milling the blended ingredients and the crosslinking system on a conventional rubber mill. Uniform crosslinking is effected by heating at temperatures from about 140° C. to about 260° C. Other methods of mixing the crosslinking system with the polymer will be apparent to those skilled in the art.

Crosslinking is effected at elevated temperatures. In general the crosslinking temperature will be from about 140° C. to about 260° C., preferably from about 150° C.

to about 225° C., and most preferably from about 150° C. to about 205° C. The time will vary inversely with the temperature and will range from about 5 seconds to 10 hours. The crosslinking temperatures and times are known to those skilled in the art.

The following examples set forth in the Table 1 illustrate the invention. The control and the examples are prepared by the same procedure. All parts and percentages in this specification are by weight unless otherwise indicated.

TABLE 1

| Ingredients | Control, Parts by Wt. 1 | Examples, Parts by Wt. 1 | 2 | 3 |
|---|---|---|---|---|
| Chlorobutyl rubber[a] | 100 | 100 | 100 | 100 |
| Chlorinated isoprene, 20% solution viscosity at 25° C. of 9-14 cps; 64-65% chlorine content | — | 10 | — | — |
| Chlorinated isoprene 20% solution viscosity at 25° C. of 17-25 cps; 64-65% chlorine content | — | — | 10 | 2 |
| Carbon black | 50 | 50 | 50 | 50 |
| Stearic acid | 1 | 1 | 1 | 1 |
| Alkyl phenolic resin, Ring and Ball s. pt. of 97° C. | 3 | 3 | 3 | 3 |
| Naphthenic oil[b] | 8 | 8 | 8 | 8 |
| Zinc oxide (ZnO) | 3.0 | 3.0 | 3.0 | 3.0 |
| Mercaptobenzo thiadiazole disulfide | 1.5 | 1.5 | 1.5 | 1.5 |
| Sulfur | 0.5 | 0.5 | 0.5 | 0.5 |

[a]Chlorinated isoprene-isobutylene copolymer, mol % unsaturation ~1.7%; ~1.2% chlorine content; and 55 Mooney viscosity at 100° C.
[b]Viscosity at 210° F., 30 (or is it 38) to 35 SUS units, aniline pt. 168° F. to 179° F.

The properties of the cured vulcanizates of the examples and of the control are set forth in Table 2.

TABLE 2

| Properties of Cured Vulcanizate (30 min. at 160° C.) | Control, Parts by Wt. 1 | Examples, Parts by Wt. 1 | 2 | 3 |
|---|---|---|---|---|
| Air Permeability[a] ($10^{-9}$ cm$^2$/sec-atm.) | 2.86 | 2.03 | 2.57 | 2.62 |
| Physical Properties[b] | | | | |
| 100% Modulus, psi | 240 | 260 | 265 | 280 |
| 200% Modulus, psi | 375 | 395 | 405 | 400 |
| Tensile Strength, psi | 1080 | 1020 | 1000 | 1030 |
| % Elongation | 900 | 850 | 860 | 870 |
| Shore A Hardness | 57 | 58 | 60 | 59 |
| Tear Resistance, lbs/in[c] | 82 | 84 | 94 | 84 |
| Adhesion to Tire Carcass[d] T-Peel lbs/in-pli | 22 | 18 | 22 | 22 |

[a]ASTM D1434 at 25° C.
[b]ASTM D412.
[c]ASTM 624 Trouser Test Specimen.
[d]Cured adhesion is measured by placing together a sheet (80 mil thick) of the uncurd tire carcass compound with the crosslinking system added and a sheet (80 mil) of uncured compounds of this invention on a sheet of the control with crosslinking system added. A polyester film is placed between the sheets at one end to provide a tab for pulling. Each sheet is backed with a cloth sheet. The pad is placed in a mold about 160 mil deep. The pad is cured for 15 minutes at 182° C. One-inch wide stripsare cut and the peel adhesion is determined by measuring the force to pull apart the cured strips according to the procedures of ASTM D418-38. The average of three pulls is reported.

The tire carcass is typically natural rubber with other rubbers, such as styrene-butadiene, added in lesser amounts and cured with a conventional sulfur cure system.

Thus, this invention provides a vulcanized rubber composition having an unexpected reduction in air permeability which is a definite advantage especially for products like tire inner tubes and tire inner liners where air retention is important.

The expression "consisting essentially of" as used in this specification excludes any unrecited substance at a concentration sufficient to substantially adversely affect the essential properties and characteristics of the composition of matter being defined, while permitting the presence of one or more unrecited substances at concentrations insufficient to substantially adversely affect said essential properties and characteristics.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed is:

1. In a pneumatic tire, the improvement which consists of a vulcanized rubber liner ply overlying all internal tire surfaces exposed in service to pressurized gas and comprising, as essential rubbery constituents, a composition consisting essentially of:
   (a) from about 80% to about 90% of a rubber material selected from the group consisting of butyl rubber, halobutyl rubber having from about 1% to about 3% by weight of halogen, and mixtures thereof; and
   (b) from about 1% to about 20% chlorinated hydrocarbon polymer selected from the group consisting of chlorinated polyisoprene having a chlorine content from about 63% to about 66% by weight and chlorinated polyolefins having a chlorine content from about 30% to about 70% by weight.

2. The pneumatic tire of claim 1 wherein the rubber material is a halobutyl rubber having from about 1% to about 3% by weight of the halogen.

3. The pneumatic tire of claim 2 wherein the halobutyl rubber is selected from the group consisting of chlorobutyl rubber, bromobutyl rubber and mixtures of chlorobutyl and bromobutyl rubber.

4. The pneumatic tire of claim 2 wherein the halobutyl rubber is chlorobutyl rubber.

5. The pneumatic tire of claim 1 wherein the chlorinated hydrocarbon polymer is present in an amount from about 2% to about 10%.

6. The pneumatic tire of claim 1 wherein the chlorinated hydrocarbon polymer is chlorinated polyisoprene.

* * * * *